United States Patent [19]

Lech, Jr. et al.

[11] Patent Number: 4,537,296
[45] Date of Patent: Aug. 27, 1985

[54] CLUTCH DRIVEN PLATE ASSEMBLY

[75] Inventors: Thaddeus Lech, Jr., Farmington Hills; Richard T. Popchock, Lake Orion, both of Mich.

[73] Assignee: Alma Piston Company, Southfield, Mich.

[21] Appl. No.: 633,715

[22] Filed: Jul. 23, 1984

[51] Int. Cl.³ .............................................. F16D 13/68
[52] U.S. Cl. ..................................... 192/106.2; 464/68
[58] Field of Search ............... 192/106.2, 106.1, 70.17, 192/70.2, 107 C; 464/68

[56] References Cited

U.S. PATENT DOCUMENTS

| | | |
|---|---|---|
| 1,963,187 | 6/1934 | Wood . |
| 2,276,870 | 3/1942 | Prantl . |
| 2,513,379 | 7/1950 | Thelander . |
| 2,745,268 | 5/1956 | Reed . |
| 3,414,101 | 12/1968 | Binder et al. . |
| 3,534,841 | 10/1970 | Schneider et al. . |
| 3,556,273 | 1/1971 | Maucher . |
| 3,800,931 | 4/1974 | Maucher . |
| 4,024,938 | 5/1977 | Maucher . |
| 4,084,674 | 4/1978 | de Gennes . |
| 4,132,103 | 1/1979 | Le Brise . |
| 4,239,097 | 12/1980 | Greacen et al. . |
| 4,318,283 | 3/1982 | Windish ............................ 192/106.2 |
| 4,418,812 | 12/1983 | Lech, Jr. . |
| 4,461,376 | 7/1984 | Lech, Jr. et al. ................. 192/106.2 |

*Primary Examiner*—Larry I. Schwartz
*Attorney, Agent, or Firm*—Cullen, Sloman, Cantor, Grauer, Scott & Rutherford

[57] ABSTRACT

The clutch driven plate assembly includes a hub assembly connectable to a driven shaft and interconnected driven and spring retainer plates rotatably mounted upon the hub assembly. The hub assembly has an inner hub and an outer hub having a driven flange between the plates. A plurality of circumferentially spaced aligned windows are provided in the plates and flange, with at least one compression spring retained within each set of aligned windows thereby defining a yieldable connection between the plates and flange. The inner hub has a cylindrical body provided with a pair of outwardly directed converging hub flanges and the outer hub has a central opening of the same shape as the hub flanges and oversized with respect thereto and loosely receiving the inner hub flanges for limited relative rotation. A back plate is spaced from the inner and outer hubs and secured to the flange, and a resilient spacer is interposed between and bears against the inner and outer hubs and back plate. Axial springs are interposed in compression between one side of the hub flanges and back plate normally biasing the hub flanges away from the back plate. A resilient washer is mounted upon the inner hub, bears against the other side of the inner hub flanges and is retained in compression between the inner hub and the driven plate. The plate springs dampen relative rotary motions between the plates and driven flange and the axial springs, spacer and washer further dampen relative rotary motions between the inner and outer hubs.

27 Claims, 15 Drawing Figures

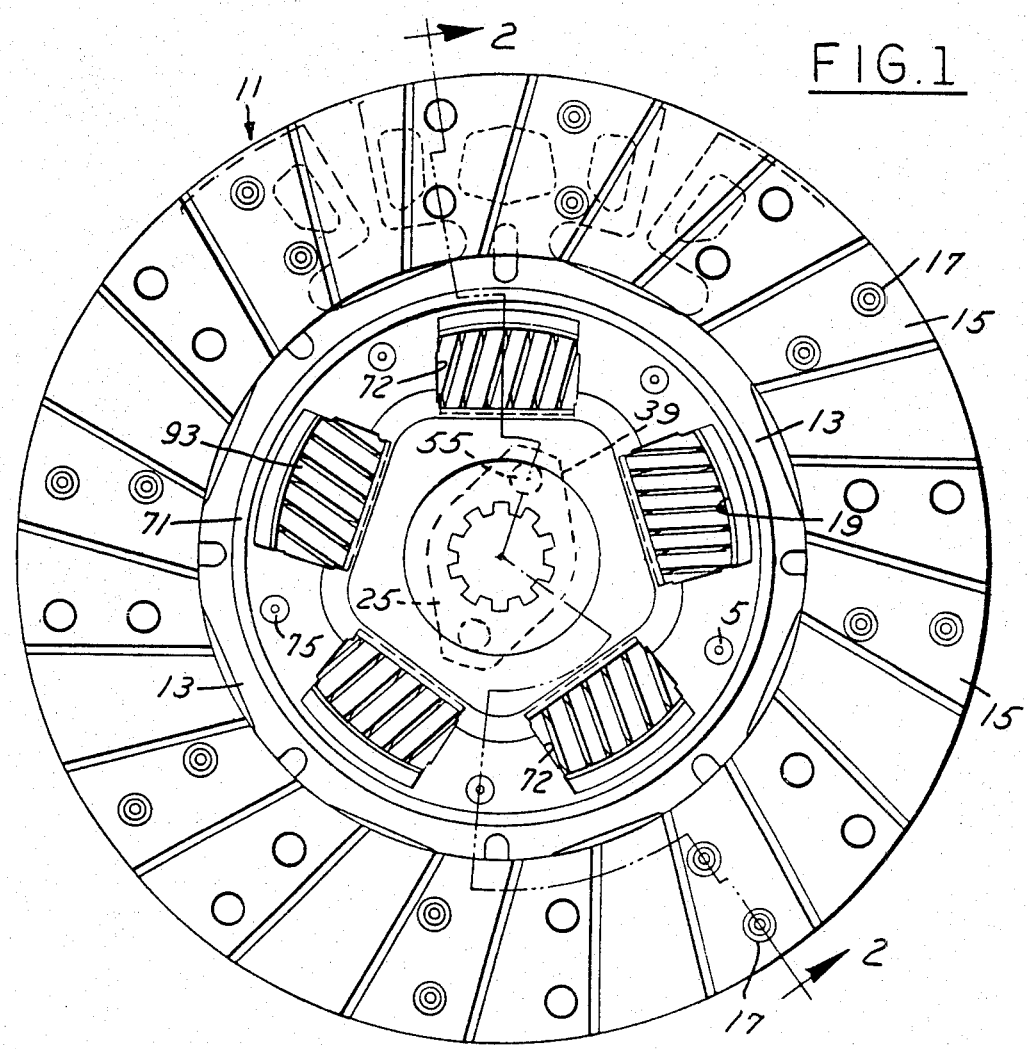
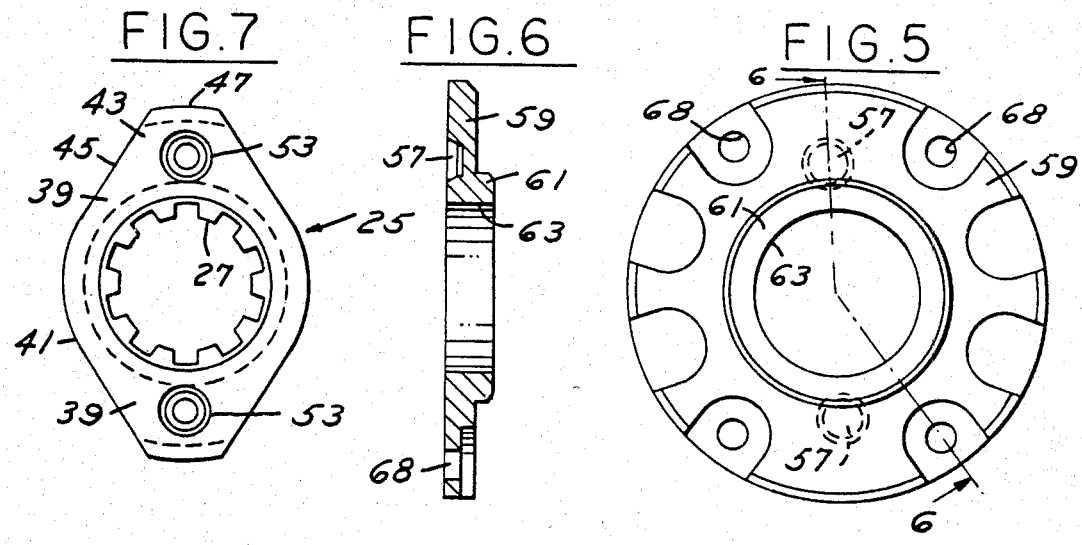

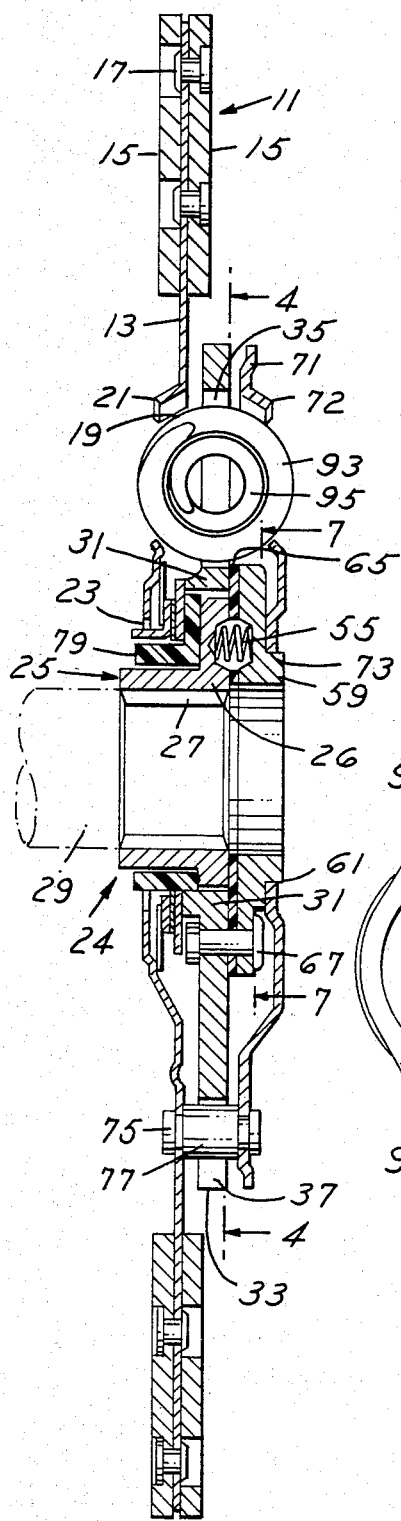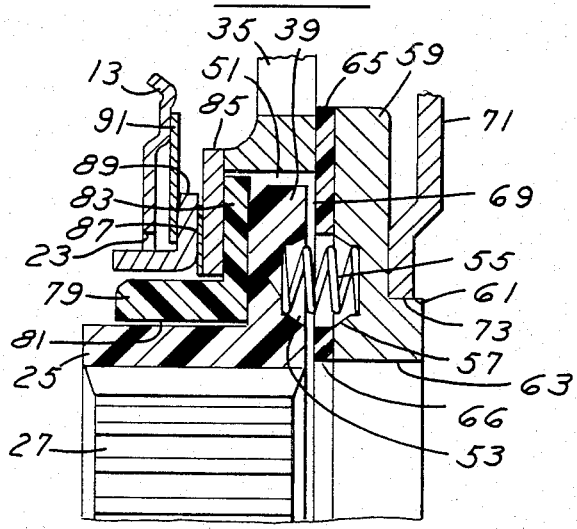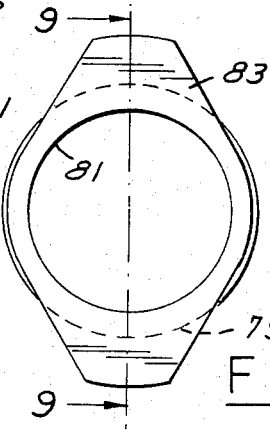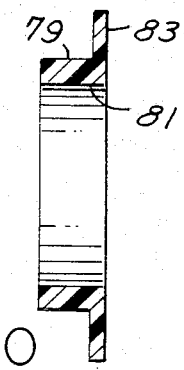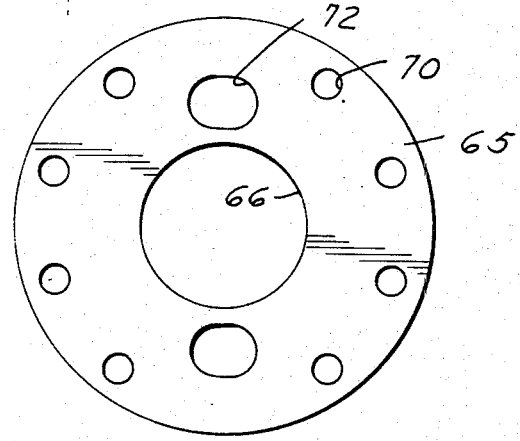

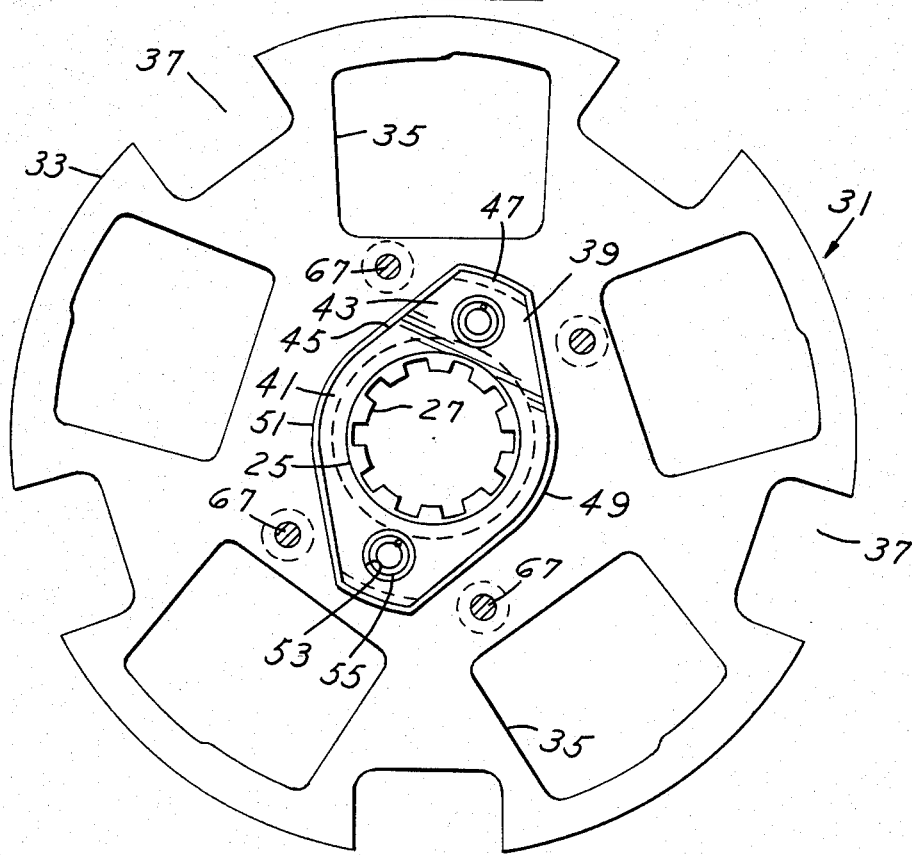

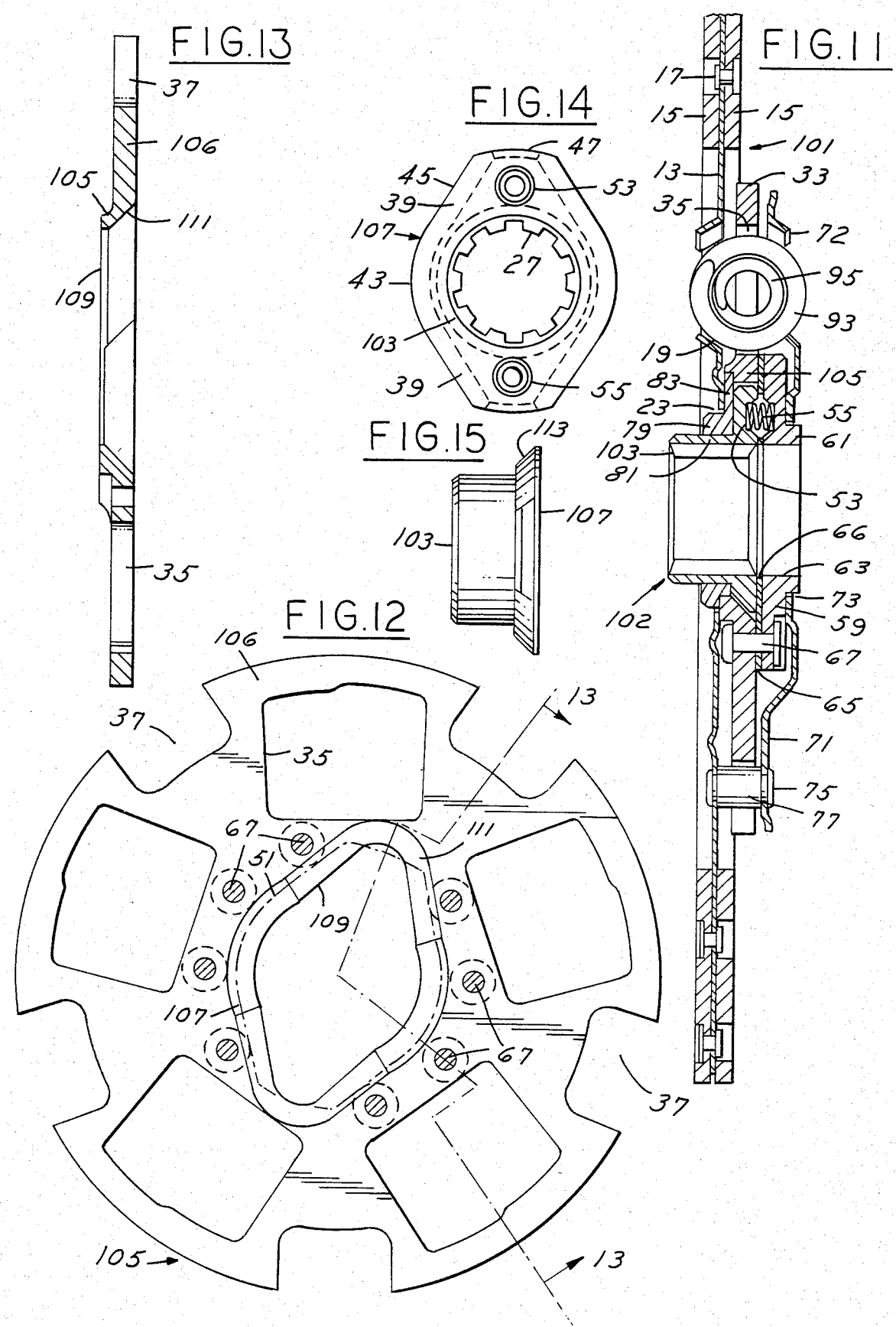

CLUTCH DRIVEN PLATE ASSEMBLY

BACKGROUND OF THE INVENTION

This invention relates to a clutch driven plate assembly similar to the conventional 10", 5 damper spring assembly having a splined hub adapted to receive and engage a driven shaft, such as for a vehicle transmission.

The conventional clutch driven plate assembly, due to the dampening action of the springs between the driven plate, spring retainer plate and an intermediate flange connected to a hub removes neutral rattle some of the time in most vehicles, once they are properly tuned, but not all the time. In the worst case, the conventional plate assemblies, only reduce neutral rattle to a commercial level. With a conventional clutch driven plate assembly, the dampening action achieved by the use of the conventional springs between the respective plates and flange are insufficient to overcome gear rattle and to absorb driveline clunk sound and shock.

THE PRIOR ART

Conventional clutch driven plate assemblies with damper springs and various hub constructions are shown in the following U.S. patents: Wood, U.S. Pat. No. 1,963,187, issued June 19, 1934; Prantl, U.S. Pat. No. 2,276,870, issued Mar. 17, 1984; Thelander, U.S. Pat. No. 2,513,379, issued July 4, 1950; Reed, U.S. Pat. No. 2,745,268; issued May 15, 1956; Binder et al, U.S. Pat. No. 3,414,101, issued Dec. 3, 1968; Schneider et al, U.S. Pat. No. 3,534,841, issued Oct. 20, 1970; Maucher, U.S. Pat. No. 3,556,273, issued Jan. 19, 1971; Maucher, U.S. Pat. No. 3,800,931, issued Apr. 2, 1974; Macher, U.S. Pat. No. 4,024,938, issued May 24, 1977; de Gennes, U.S. Pat. No. 4,084,674, issued Apr. 18, 1978; Le Brise, U.S. Pat. No. 4,132,103, issued Jan. 2, 1979; Greacen et al, U.S. Pat. No. 4,239,097, issued Dec. 16, 1980; and Lech, Jr., U.S. Pat. No. 4,418,812, issued Dec. 6, 1983.

SUMMARY OF THE INVENTION

An important feature of the present invention is an improvement upon the conventional clutch driven plate assembly by providing therefore a two piece hub assembly including an inner and outer hub and with the inner hub being internally splined to receive and to engage a driven shaft such as for a vehicle transmission, though not limited thereto.

Another feature of the present invention is to add an additional travel between the normal drive and coast damper travel and more specifically to provide additional travel between the clutch driven plate and the inner hub for removing neutral rattle and for absorbing driveline clunk sound and shock.

A further feature of the present invention is that the two piece hub assembly does not affect the normal portion damper capacity, travel and friction lag of the multiple stage spring damper assembly or construction. The driveline performance, with respect to gear rattle, remain the same.

A still further feature of the present invention is to provide a two piece hub assembly consisting of an inner hub and outer hub which have complementary engaging 45° wedge surfaces in a manner which provides an extra 6° of rotational travel therebetween and additional rotational travel between the driven plate and the inner hub.

Still another feature of the present invention is to provide 45° wedge surfaces as a part of the inner hub which fit within an oversized, similarly shaped, central aperture or opening provided in the outer hub, which is relatively rotatable, in order to deflect clunk forces into a back plate which is insulated by a non-metallic impact absorbing spacer. With such a construction, the 45° wedge surfaces deflect clunk forces into an insulated member which is located in the axial plane.

A further feature of the present invention is the provision of the two piece hub assembly to diminish the driveline clunk force componentially by deflecting it out of plane by a two plane action. The spacer absorbs the metallic clunk sound and softens the impact feel by increasing shock time.

A still further feature of the present invention is that the back plate employed in conjunction with the two piece hub assembly is secured to the outer hub by rivets which are sufficient to withstand a clunk force several times full damper capacity.

Another feature of the present invention contemplates the employment of axially disposed spring means which are interposed between the back plate and the inner hub so that upon relative rotation therebetween the spring means are skewed in a manner between the inner hub and back plate to generate spring force which gives the capacity in conjunction with their installed preload of forcing the inner hub against resilient washer or bushing to generate a low level friction lag for 6° of travel. Relative actions between the inner and outer hubs further provide a low rate "friction device" to remove neutral rattle and a heavy duty clunk fix.

These and other features and objects will be seen from the following Specification and claims in conjunction with the appended drawings.

IN THE DRAWINGS

FIG. 1 is a front elevational view of the present clutch driven plate assembly.

FIG. 2 is a vertical section of the clutch driven plate assembly taken in the direction of arrows 2—2 of FIG. 1.

FIG. 3 is a fragmentary, but similar view, on an enlarged scale, illustrating the detail and relationship between the inner and outer hubs and back plate of the present clutch driven plate assembly of FIG. 2.

FIG. 4 is a fragmentary elevational view of the inner and outer hubs and outer hub flange taken in the direction of arrows 4—4 of FIG. 2.

FIG. 5 is an elevational view of the back plate shown in FIG. 2.

FIG. 6 is a sectional view taken in the direction of arrows 6—6 of FIG. 5.

FIG. 7 is an end elevational view of the inner hub taken in the direction of arrows 7—7 of FIG. 2.

FIG. 8 is an end elevational view of the washer or bushing shown in FIG. 2.

FIG. 9 is a section through the washer taken in the direction of arrows 9—9 of FIG. 8.

FIG. 10 is a front elevational view of the resilient disc spacer shown in FIG. 2.

FIG. 11 is a vertical section, similar to FIG. 2, showing a modified clutch driven plate assembly having a two piece hub assembly.

FIG. 12 is a rear elevational view of the inner and outer hubs shown in FIG. 11.

FIG. 13 is a sectional view taken in the direction of arrows 13—13 of FIG. 12, showing the outer hub.

FIG. 14 is a rear elevational view of the inner hub shown in FIG. 11.

FIG. 15 is a side elevational view of the inner hub shown in FIG. 11.

It will be understood that the drawings illustrate preferred embodiments of the invention and that other embodiments are contemplated within the scope of the claims hereafter set forth.

DESCRIPTION OF A PREFERRED EMBODIMENT

Referring to the drawings, FIGS. 1 through 10, the present clutch driven plate assembly is generally indicated at 11, FIGS. 1 and 2, and includes a conventional driven plate or disc 13 having mounted thereon adjacent its periphery and on opposite sides frictional facings 15 of a conventional construction secured thereon by a plurality of insert rivets 17. Formed within driven plate 13, FIG. 2, are a plurality of circumferentially spaced spring windows 19 having upon opposite sides of each window opening 19 a pair of outwardly directed converging flaps 21 adapted to retainingly engage the sides of coiled springs 93 and 95.

Driven plate 13 is axially apertured at 23 to receive and is supported upon the inner hub 25, which forms a part of the present two piece hub assembly 24. The inner hub 25 has a cylindrical body 26 with an internally splined bore 27 adapted to receive and operatively engage driven shaft 29 to a vehicle transmission or the like, said shaft 29 being shown in dash lines in FIG. 2.

Outer hub 31 receives the inner hub 25 and includes driven flange 33, FIG. 2, shown assembled in FIG. 4. A similar series of circumferentially spaced windows or pockets 35 are formed through flange 33 of the outer hub 31 adapted for lateral registry with the corresponding window apertures 19 within driven plate 13. A plurality of circumferentially spaced stop notches 37 are formed around the perimeter of outer hub driven flange 33.

Formed upon the body or sleeve of the inner hub 25 are a pair of outwardly directed converging radial flanges 39, FIG. 4, which at their inner ends merge with the opposed curved sides 41 as a tangential continuation thereof. Outer ends of the inner radial flanges 39 are tapered as at 43, FIG. 7, including the straight sides 45 which terminate in the opposed arcuate ends 47. This provides flange portions of the inner hub 25 of general elliptical shape.

Formed within the outer hub flange 33 is an oversized elliptical socket 49, FIG. 4, which is substantially the same general elliptical shape as the inner hub radial flanges so as to loosely, but cooperatively receive the inner hub flanges. There is thus defined between the corresponding sides of the inner hub radial flanges 39 and the walls of the socket or opening 49 a spacing 51 (FIG. 4) which is sufficient to permit relative rotary movement of the outer hub driven flange 33 with respect to the inner hub radial flanges 39.

The spacing between the inner hub flanges 39 and the corresponding walls of the opening 49 of outer hub flange at 51 is sufficient to permit a relative rotary movement of the driven flange 33 with respect to the inner hub 25 of 6°, approximately. This may vary from 6° to 8°.

Formed in the rear surface of the inner hub 25 and within portions of the inner hub radial flanges 39 are a pair of spaced spring sockets 53 adapted to receive the corresponding one ends of the secondary damper coil springs 55, FIGS. 2 and 3, sometimes referred to as axial spring means 55.

The other ends of the damper springs 55, of which a pair are shown in the illustrative embodiment, project into and are received and retained within corresponding spring sockets 57 formed within back plate 59, FIGS. 2, 3 and 5. Back plate 59 has an axial annular flange 61 defining the bore 63 in alignment with and greater than the diameter of the splined bore 27 of the inner hub 25.

Resilient spacer 65, FIGS. 2, 3 and 10, has a bore 66 and is interposed between back plate 59 and the inner hub 25 and its flanges 39, and portions of the outer hub 33, as shown in detail in FIG. 3. In the illustrative embodiment, the resilient spacer 65, as an example, is constructed to include Nylon, 15 percent glass filled, for illustration, and 10 percent Teflon.

Back plate 59, FIG. 5, has a plurality of bores 68 to receive a plurality of rivets 67 which extend through the back plate 59, through apertures 70 in the interposed resilient disc spacer 65 in and through corresponding openings within the outer hub flange 33 for securing the components. Springs 55 are interposed in compression. As shown in FIG. 3, on an increased scale, springs 55 axially bias the inner hub flanges 39 and inner hub 25 away from the resilient disc spacer 65, such as shown by the spacing 69, FIG. 3.

Spring retainer plate 71, FIGS. 1, 2 and 3, is of circular shape and has formed therethrough a plurality of circumferentially spaced windows 72 adapted to receive portions of the respective damper springs 93 and 95, FIGS. 1 and 2. In use, the corresponding windows 19, 35 and 72 formed within the corresponding driven plate 13, flange 33 and spring retainer plate 71 are in alignment to receive and retain at least one compression spring 93 therebetween and for establishing a yielding spring relationship between plates 13 and 71 and the intermediate outer hub flange 33, FIG. 2. The spring retainer plater 71 has an internal bore 73, FIG. 3, which receives the annular flange or shoulder provided upon back plate 59.

Assembly of the driven plate 13 and the spring retainer plate 71 laterally spaced therefrom with the intermediate outer hub flange 33, includes a plurality of spaced transverse stop pins 75 and spacers 77, FIG. 2. The assembly in FIG. 2, is held together in compression.

The corresponding stop pins 75 and spacers 77 extend loosely through the outwardly opening notches 37 of the outer hub flange 33 and are adapted to limit relative rotary movement of the driven plate 13 with respect to the outer hub flange 33.

This construction permits through the intermediate springs 93, 95, a yielding relative movement of the driven plate 13 and the connected spring retainer plate 71 with respect to the driven flange 33 of the outer hub 31.

The spring retainer plate 71 similarly has on opposite sides of its windows 72, opposed pairs of outwardly directed inclined spring retainer flaps 72. Thus, within the assembly shown in FIG. 2, corresponding springs 93, 95, are nested within the laterally aligned respective windows of the plates 13, 71 and flange 33, retained therein to establish a yielding relationship between the interconnected plates 13 and 71 and the intermediate outer hub flange 33.

The assembly of the inner and outer hubs 25 and 31 within and with respect to the driven plate 13 includes a molded plastic or resilient washer 79, FIGS. 2, 8 and 9, having a bore 81, which is adapted to be loosely positioned around the inner hub 25, FIG. 2.

At one end of the washer 79 there are provided a pair of outwardly directed inwardly converging tapered end flanges 83, FIGS. 8 and 9, which are substantially similar in shape to the inner radial flanges 39, FIG. 4 and which bear against one side of the inner radial flanges 39, as illustrated in FIGS. 2 and 3.

Apertured spacer 85, FIG. 3, receives the cylindrical portion of the resilient washer 79 and bears against the corresponding end flanges 83 of the resilient washer 79, with portions of the spacer 85 engaging the outer hub 31, FIGS. 2 and 3. In the illustrative embodiment, one or more apertured shims 87 surround the resilient washer 79, FIG. 3. In the illustrative embodiment, a centrally apertured four tab washer 89 further surrounds the sleeve body portion of the resilient washer 79, bears against the shim 87, and is yieldably retained there-against by the apertured Belleville spring 91.

The Belleville spring 91, engages the interior surface of the driven plate 13 in compression. Stop pins and spacers 75–77 secure together the corresponding plates 13 and 71 and with the assembly of spacer 85, shim 87, washer 89, and Belleville spring 91 in compression, FIG. 3.

In the illustrative embodiment, within the laterally aligned spaced windows in the plates 13 and 71 and flange 33, there is provided an outer damper compression spring 93 and concentrically therein an inner damper spring 95.

These springs 93 and 95 are retained within the aligned windows and anchored with respect to the plates 13 and 71, which are interconnected. This provides a yielding relationship between the plates 13 and 71 and the intermediate outer hub flange 33. By this construction in operation, the rotary torque applied to the driven plate 13 is transmitted to spring retainer plate 71 secured thereto, to establish a yielding relation between the plates 13 and 71 and the outer hub flange 33. There is a relative dampening rotary movement of the plates 13 and 71 with respect to the outer hub flange 33. This in itself is a conventional construction.

In operation, the present two piece hub assembly 24 including inner hub 25 and its flanges 39 are normally biased axially by the opposed pair of dampening springs 55. Normally the springs 55 bias the inner hub 25 axially into operative engagement with the resilient washer 79 for surface frictional engagement therewith.

In operation, the relative rotary movement of the outer hub 31 with respect to the inner hub 25 creats a rotational gap with respect to back plate 59. Since the back plate 59 is secured to flange 33 of the outer hub 31, relative rotary movement thereof with respect to the inner hub flanges 39 creates a rotational gap so that the axial springs 55 are skewed, generating a rotational force and creating energy in the springs 55. This friction force is transmitted to the bushing or resilient washer 79 through the corresponding inner hub flanges 39, with the flanges 39 in operative frictional engagement with washer 79, FIGS. 2 and 3, thereby converting the force to heat.

At the same time, the opposite or outer surfaces of the respective inner hub 25 and flanges 39, frictionally engage the intermediate resilient disc spacer 65. This establishes frictional forces therebetween. The forces combine to provide a secondary dampening action between the inner and outer hubs 25 and 31 for absorbing neutral rattle, driveline clunk sound and shock.

The purpose of the 45° tapered surfaces 39 and 43, upon the inner hub 25 is to deflect clunk forces axially into the back plate 59 which is insulated by the non-metallic impact absorbing spacer 65.

The corresponding 45° tapered wedge surfaces upon the inner hub flanges 39 in the corresponding similarly shaped oversized aperture 49 within the outer hub flange 33, FIG. 4, provide such relative rotary movement between the inner and outer hubs 25 and 31 of approximately 6°, for illustration. This action diminishes the driveline clunk force componentionally by deflecting the force out of plane. Thus, the resilient spacer 65 absorbs the metallic clunk sound and softens the impact feel by increasing shock time.

In the illustrative embodiment, the back plate 65 is restrained by the rivets 67 sufficiently to withstand a clunk force of several times full damper capacity.

The two axial springs or spring means 55 engage the inner hub 25 and the corresponding back plate 59 to provide a capacity of less than 1.0 lb. ft. for 6° of travel.

The springs 55 operate in a skewed manner between the inner hub 25 and the back plate 59 to generate a spring force which gives the capacity in view of the spring pre-load forces for urging the inner hub 25 axially against the resilient washer 79 to generate a low level friction lag.

The actions between the two piece hub assembly 24 provide a low rate "friction device" to remove neutral rattle and a heavy duty clunk fix. The present two piece hub assembly 25 will out perform other friction devices because of the two plane actions, which will reduce the effects of resonance. This is because the driveline is a vibratory environment, and the damper parts in plane are urged to resonate in tune instead of doing what they are supposed to do. The present two piece hub assembly 24 operates with an action integrated between the rotational and axial plane which reduces the effect of resonance. At the same time, the remaining portion of the clutch driven plate assembly 11 operates in a conventional manner as disclosed in the prior art.

The springs 93 and 95 provide a dampening action with respect to relative rotary motion between the plates 13, 71 and the interior outer hub flange 33.

The axial spring means namely, the pair of spaced axially directed compression springs 55 in conjunction with the spacer disc 65 and the resilient washer 79 provide further dampening relative rotary motion between the inner and outer hubs 25 and 31 thereby providing an additional relative travel of the driven plate 13 with respect to inner hub 25.

MODIFIED CLUTCH DRIVEN PLATE ASSEMBLY

A modified clutch driven plate assembly is generally indicated at 101, FIGS. 11 through 15. The construction and operation is similar to the embodiment disclosed in FIGS. 1 through 10, and common portions thereof are not repeated in the description.

In the modified clutch driven plate assembly 101, there is provided again a two piece hub assembly 102 which includes the inner hub 103 and the corresponding outer hub 105 including the outer hub circular driven flange 106, FIG. 12.

The inner hub 103 includes at one end a pair of outwardly directed flanges 107 having inclined or converging tapered sides 45 which tangentially merge with the opposed arcuate portions 43 as a part of the inner hub 103. The construction of the inner hub 103, otherwise, is substantially similar to the inner hub 25 and its flanges 39-43, FIGS. 4 and 7.

The primary difference between the two clutch driven plate assemblies 11 and 101 is that centrally of the outer hub flange 106 in assembly 101, there is provided an oversized elliptical socket 109 similar in shape to the inner radial flanges 107 and for loose postioning therein such as shown in FIG. 12.

Upon the interior of the outer driven flange 106 adjacent the elliptical socket or central aperture 109, there is formed a continuous tapered surface 111, which in the illustrative embodiment is arranged at 45°, as is shown in FIGS. 11 and 13. Formed upon a portion of the inner radial flanges 39-43, is the corresponding externally tapered surface portion 113 (FIG. 15) normally in cooperative engaging registry with outer hub flange tapered surface 111.

Accordingly, as shown in FIG. 11, axial forces directed to the inner hub 103 are transmitted to the outer hub flange 106 for operating frictional engagement with the resilient washer 79.

In the illustration in FIG. 11, internal portions of the driven plate 13 operatively and retainingly engage flange portions of the resilient washer 79. Thus, axial thrust delivered to the inner hub 103 by the springs 55 is transmitted to the driven flange 106 of the outer hub 105. Corresponding plastic washer 79 is also in operative engagement with the outer hub flange 106. Axial thrust upon the inner hub 103 causes the outer hub flange 106 to frictionally engage the resilient washer 79 causing a friction build up for utilizing energy transmitted by the springs 55 during relative motions between the inner and outer hubs 103 and 105. This frictional force uses up the energy transmitted by the secondary damper springs 55.

Having described by my invention, reference should now to had to the following claims:

I claim:

1. A clutch driven plate assembly comprising a hub assembly connectable to a driven shaft;

a driven plate having a peripheral friction facing rotatably mounted upon said hub assembly;

a spring retainer plate rotatably mounted upon said hub assembly and spaced from and secured to said driven plate and rotatable therewith;

said hub assembly including an inner hub and an outer hub having a driven flange;

said inner hub having a splined bore and a pair of outwardly directed converging radial flanges;

said outer hub flange being interposed between said driven plate and said spring retainer plate and having a central opening of the same shape and oversized with respect to and loosely receiving said inner hub flanges for limited rotation thereof relative to said inner hub flanges;

a centrally apertured back plate upon the interior of and bearing against said spring retainer plate and spaced from said inner and outer hubs and secured to said outer hub flange;

a resilient apertured disc spacer interposed between and bearing against said inner and outer hubs and back plate and bearing against said inner hub flanges and outer hub flange on one side of said inner hub;

axial spring means interposed in compression between said inner hub flanges and said back plate normally biasing said inner hub flanges away from said back plate;

a resilient washer mounted upon said inner hub bearing against the other side of said inner hub flanges and retained between said inner hub and said driven plate;

there being a plurality of circumferentially spaced axially aligned windows in said plates and outer hub flange;

and at least one compression spring nested and retained within each set of laterally aligned windows defining a yieldable connection between said driven plate and outer hub flange;

said springs dampening relative rotary motions between said plates and said outer hub flange;

said spring means, spacer disc and washer further dampening relative rotary motions betwen said inner and outer hubs.

2. In the clutch driven plate assembly of claim 1, said inner hub flanges being arranged at one end of said inner hub and coplanar with said outer hub flange.

3. In the clutch driven plate assembly of claim 1, said inner hub including a cylindrical body, said radial flanges at their inner ends terminating in opposed arcuate portions laterally outward and of a diameter greater than said body.

4. In the clutch driven plate assembly of claim 3, said radial flanges forming tangential extensions of said arcuate portions and at their outer ends terminating opposed arcuate portions defining a generally elliptical shape.

5. In the clutch driven plate assembly of claim 4, the walls defining the central opening of said outer hub flange being generally parallel to and spaced outwardly of said inner hub flanges and arcuate portions, providing additional rotation of said outer hub relative to said inner hub, and corresponding additional rotary travel between the driven plate and said inner hub.

6. In the clutch driven plate assembly of claim 5, said additional rotary travel being 6°, approximately.

7. In the clutch driven plate assembly of claim 3, said outer hub flange opening and said inner hub flanges providing complimentary engaging 45° wedge suraces, approximately, providing additional rotation of said outer hub relative to said inner hub and corresponding additional travel between said driven plate and said inner hub.

8. In the clutch driven plate assembly of claim 1, said inner hub and back plate having opposed pairs of spaced axial apertures therein;

said axial spring means including a pair of coil springs with their ends nested and retained within said apertures respectively.

9. In the clutch driven plate assembly of claim 8, relative rotation between said back plate and inner hub defining a rotational gap therebetween, said rotation skewing said springs generating rotational energy forces in said springs and consequent friction forces between said inner hub and said spacer and washer converting said energy forces to heat.

10. In the clutch driven plate assembly of claim 8, the securing of said back plate to said outer hub flange including a plurality of spaced fasteners extending through said back plate and the outer hub flange and through corresponding apertures in said spacer, said springs extending through said spacer.

11. In the clutch driven plate assembly of claim 1, said resilient spacer including Nyon, 15 percent glass filled and 10 percent Teflon;

said resilient washer being similarly constructed.

12. In the clutch driven plate assembly of claim 1, said resilient washer being of a plastic material.

13. In the clutch driven plate assembly of claim 1, said washer having a pair of radial converging flanges corresponding to said inner hub flanges.

14. In the clutch driven plate assembly of claim 1, said washer including a sleeve mounted upon and around said inner hub and a pair of outwardly directed radial flanges bearing against said inner hub flanges and retained between said inner hub and said driven plate.

15. In the clutch driven plate assembly of claim 14, the retaining of said washer by said driven plate including an apertured spacer positioned around said washer and a Belleville spring positioned around said washer and interposed in compression between said driven plate and said spacer.

16. In the clutch driven plate assembly of claim 1, said inner hub flanges operatively bearing against said resilient washer and said spacer disc in relative rotary frictional engagement therewith.

17. In the clutch driven plate assembly of claim 1, an annular flange on said back plate receiving and extending through said spring retainer plate.

18. In the clutch driven plate assembly of claim 1, the securing of said spring retainer plate to said driven plate including a plurality of spaced stop pins extending between said plates and through a series of circumferentially spaced oversized slots in the periphery of said outer hub flange for limiting rotary movements of said driven plate relative to said flange.

19. In the clutch driven plate assembly of claim 1, the retaining of said springs within said plate windows including outwardly directed converging flaps exending from said plates upon opposite sides of said windows.

20. In the clutch driven plate assembly of claim 1, the interior of said outer hub flange having a continuous tapered surface surrounding its opening;

the outer surface of said inner hub flanges having a corresponding complementary tapered edge in operative engagement with said flange tapered surface whereby axial forces on said inner hub are transferred to said outer hub and to said washer.

21. In the clutch driven plate assembly of claim 20, said tapered surfaces being inclined at an angle of 45°, approximately.

22. In the clutch driven plate assembly of claim 20, portions of said washer bearing against said outer hub flange.

23. In the clutch driven plate assembly of claim 3, the interior of said outer hub flange having a continuous tapered surface surrounding its opening;

the outer surface of said inner hub flanges and arcuate portions having a corresponding complementary tapered edge in cooperative engagement with said flange tapered surface whereby axial forces on said inner hub are transferred to said outer hub and to said washer.

24. In a clutch driven plate assembly having a hub assembly connectable to a driven shaft, a driven plate having a peripheral friction facing rotatably mounted upon said hub assembly, a spring retainer plate rotatably mounted upon said hub assembly and spaced from and secured to said driven plate and rotatable therewith, said hub assembly including an inner hub and an outer hub having a driven flange, there being a plurality of circumferentially spaced axially aligned windows in said plates and outer hub flange, and at least one compression spring nested and retained within each set of laterally aligned windows defining a yieldable connection between said driven plate and outer hub flange, the improvement comprising said inner hub having a splined bore and a pair of outwardly directed converging radial flanges;

said outer hub flange being interposed between said driven plate and said spring retainer plate and having a central opening of the same shape and oversized with respect to and loosely receiving said inner hub flanges for limited rotation thereof relative to said inner hub flanges;

said hub assembly including a centrally apertured back plate upon the interior of and bearing against said spring retainer plate and spaced from said inner and outer hubs and secured to said outer hub flange;

a resilient apertured disc spacer interposed between and bearing against said inner and outer hubs and back plate and bearing against said inner hub flanges and outer hub flange on one side of said inner hub;

axial spring means interposed in compression between said inner hub flanges and said back plate normally biasing said inner hub flanges away from said back plate;

a resilient washer mounted upon said inner hub bearing against the other side of said inner hub flanges and retained between said inner hub and said driven plate;

said springs dampening relative rotary motions between said plates and said outer hub flange; and said spring means, disc spacer and resilient washer further dampening relative rotary motions between said inner and outer hubs.

25. In the clutch driven plate assembly of claim 24, the interior of said outer hub flange having a continuous tapered surface surrounding its opening;

the outer surface of said inner hub flanges having a corresponding complementary tapered edge in operative engagement with said flange tapered surface whereby axial forces on said inner hub are transferred to said outer hub and to said washer.

26. In the clutch driven plate assembly of claim 25, the tapered surfaces being inclined at an angle of 45°, approximately.

27. In the clutch driven plate assembly of claim 25, portions of said washer bearing against said outer hub flange.

* * * * *